United States Patent [19]
Ziegelmeyer

[11] Patent Number: 4,525,097
[45] Date of Patent: Jun. 25, 1985

[54] FORCE MULTIPLYING LOCKING ARRANGEMENT

[76] Inventor: Harold R. Ziegelmeyer, 5010 Griffen Creek Rd., Medford, Oreg. 97501

[21] Appl. No.: 532,104

[22] Filed: Sep. 14, 1983

Related U.S. Application Data

[63] Continuation of Ser. No. 256,852, Apr. 23, 1981, abandoned.

[51] Int. Cl.³ .............................................. E21D 20/02
[52] U.S. Cl. .................................... 403/259; 403/374; 403/409; 279/50; 279/78; 242/68.3
[58] Field of Search .............. 403/259, 261, 345, 409, 403/374, DIG. 8; 279/50, 52, 78, 75, 69, 81; 409/233; 242/68.3, 129.5

[56] References Cited

U.S. PATENT DOCUMENTS 3,276,718 10/1966 Binford .............................. 242/68.3
3,533,636 10/1970 Fiestone et al. ...................... 279/50
4,009,742 3/1977 Ziegelmeyer ............... 144/117 B X

FOREIGN PATENT DOCUMENTS 2444661 4/1976 Fed. Rep. of Germany ...... 353/403
1277884 10/1963 France ................................ 403/370
571630 9/1977 U.S.S.R. ............................. 403/371

Primary Examiner—Cornelius J. Husar
Assistant Examiner—Todd G. Williams
Attorney, Agent, or Firm—Neil J. Driscoll

[57] ABSTRACT

A force multiplying and locking arrangement is disclosed to lock, for example, a cutting tool to a spindle. It comprises main body arranged to be threadably mounted on a spindle, said main body having a pressure ring at its forward aspect mounted to accommodate movement longitudinally of the arrangement and to inhibit movement rotationally of the arrangement. A cavity is defined by said pressure ring and said main body and includes an inclined plane. The cavity has a plurality of spherical balls disposed therein. Said main body is peripherally threaded to accommodate the threadable mounting of a compression ring having, at its forward aspect, a conical inclined plane overlying the cavity and the first mentioned inclined plane. Rotation of the compression ring forces the spherical balls into the cavity engaging the inclined planes and the pressure ring and greatly multiplying the force for locking the device. Reverse rotation of the compression ring releases the locking force.

6 Claims, 4 Drawing Figures

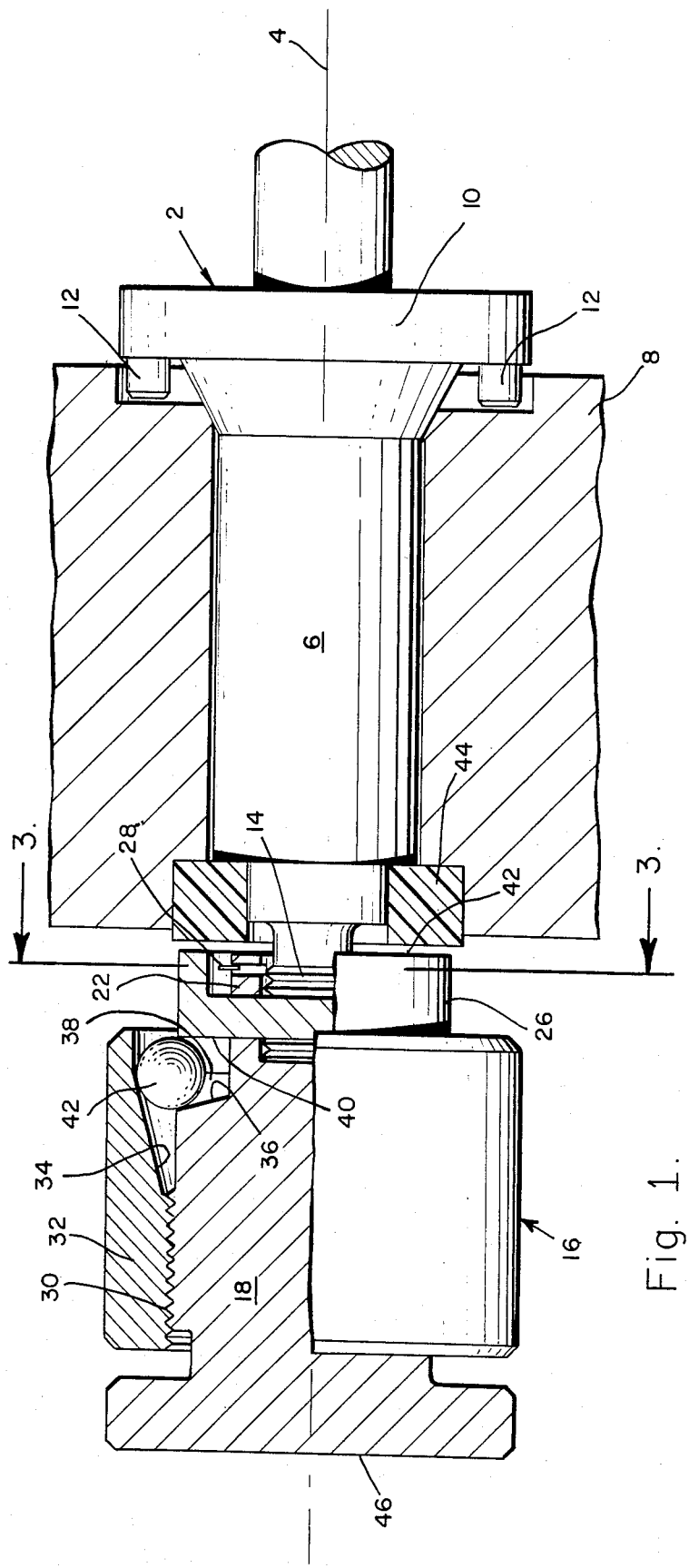
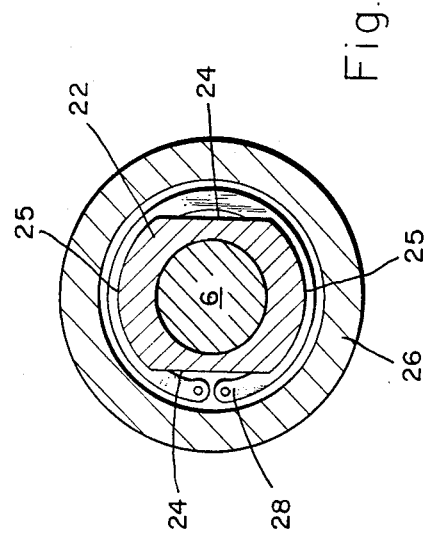
Fig. 1.
Fig. 3.

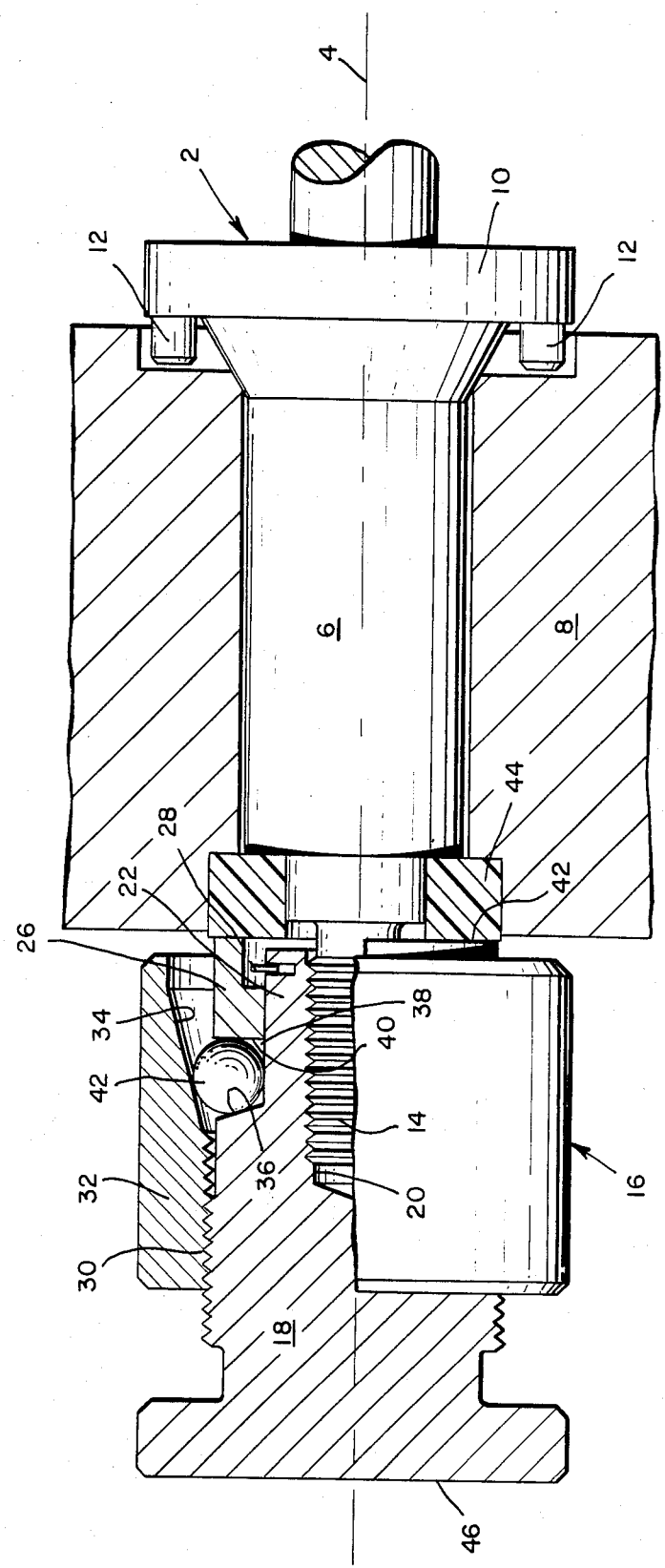
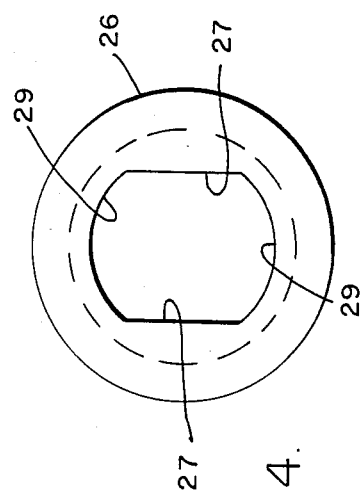
Fig. 2.
Fig. 4.

FORCE MULTIPLYING LOCKING ARRANGEMENT

This application is a continuation of prior U.S. application Ser. No. 256,852, filed Apr. 23, 1981, now abandoned.

BACKGROUND OF THE INVENTION

1. Field of the Invention

The invention relates to a force multiplying arrangement that has particular utility where it is necessary to firmly lock in position delicately located or balanced equipment without the necessity of the rough application of torquing forces via the use of wrenches or other levers which would likely disturb the delicate balance or position of the equipment being locked.

2. Description of the Prior Art

Persons skilled in the art of elementary mechanic have long been aware of a group of devices commonly known as "simple machines: which achieve mechanical advantage basically via the translation of distance and force. The more common type of these "simple machines" are the fulcrumed lever, the inclined plane and a screw thread, the latter being a combination of a simple lever and inclined plane.

A common field that has effectively used "simple machines" is the clutching art. In its simplest form a clutch is a coupling used to connect and disconnect a driving and a driven part of a mechanism. For example, U.S. Pat. No. 1,964,479 issued Jan. 26, 1934, teaches the use of cooperating inclined planes in operative series relationship with a simple fulcrumed lever to sequentially create and release pressure on a plurality of engageable friction plates to thereby accomplish drive connect and disconnect. U.S. Pat. No. 2,140,619 issued Dec. 20, 1938, teaches a simple toggle lever sequentially cooperating with a pair of inclined planes to sequentially bring a plurality of discs into frictional engagement and thereby break and make power transmission. Likewise, U.S. Pat. No. 2,443,901 issued June 22, 1948, teaches in operative series relationship, a shipper lever, a first inclined plane and a ball and wedging cavity to again sequentially induce clutch engagement and disengagement.

It is interesting to note, however, that in all of these prior art arrangements, while there is still some force appreciation or multiplication, it is the primary purpose of these devices to merely change the direction of motion to induce clutch engagement and disengagement.

SUMMARY OF THE INVENTION

In many machine service applications it is necessary to both delicately balance and firmly hold a piece of equipment. For example, high speed cutting and milling tools are frequently mounted, in cantilever fashion, on a protruding, rotatable spindle. It is a job imperative that these cutting tools be securely mounted to the spindle and it is a further necessity that the spindle run absolutely true to accomplish the close tolerance cutting or milling operation. Heretofore, machine operators would mount the cutting tool to the spindle and then lock the spindle in position using a conventional nut and lock washer assembly. Locking pressure was applied using long-handled box wrenches, or the like, and frequently, hammer impact to secure that nut and washer assembly. Frequently, the application of the leveraged and impact forces to the spindle cutting tool assembly damaged the spindle alignment which resulted in eccentric rotation of the cutting tool completely destroying its usefulness in the milling operation. The spindle had to be repaired before the job could continue. Other problems will occur to those skilled in the art as, for example, where it is necessary to accurately locate the pressure lock a piece part to a machine table, the attempt to crudely pressure lock the piece part to the table would impair its accurate location thereon. Eg., see my U.S. Pat. No. 4,009,742, Mar. 1, 1977.

It is, therefore, a primary object of the invention to provide a new and unique force multiplying and arbor locking arrangement.

It is a further object of the invention to provide a force multiplying and arbor locking arrangement whereby the device may be positioned and locked into position by manual action only, completely eliminating the necessity for wrenches, hammers or the like.

It is yet a further object of the invention to provide a device of the type described which achieves force multiplication by having an arrangement in operative series of a pair of inclined planes coupled with a screw thread.

It is another object of the invention to provide a force multiplying arrangement of the type described immediately above which includes a unique pressure applying ring having the capability of longitudinal movement in respect to the device coupled with structure to inhibit rotational movement of the pressure ring, thereby preventing dissipation of the created pressure even in an environment of high vibratory energy incident to the operation of the equipment on which the device is used.

These and other objects and advantages of the invention will become apparent in the course of the following description and explanation of the presently preferred embodiment.

BRIEF DESCRIPTION OF THE DRAWINGS

FIG. 1 is a vertical sectional view, partly in elevation, of the force multiplying and locking arrangement in released position.

FIG. 2 is a vertical sectional view similar to FIG. 1 and partly in elevation of the force multiplying and locking arrangement in force applying position.

FIG. 3 is a sectional view taken along Line 3—3 of FIG. 1 and

FIG. 4 is an elevational detail view of the pressure applying ring.

DESCRIPTION OF THE PREFERRED EMBODIMENT

Directing attention to the drawings, the numeral 2 indicates a spindle which is mounted, in a conventional manner not shown, for accurate rotation about its centerline indicated by the numeral 4. The spindle 2 has a tool mounting segment 6 which is adapted to carry any conventional cutting or milling equipment shown schematically at 8. The spindle 2 also has a driving flange 10, including drive pins 12, 12 which cooperate with the tool 8 whereby the tool 8 may rotate at high speed concurrently with the rotation of the spindle 2.

At its left terminus the spindle 2 is provided with a threaded projection or segment 14 which is adapted to receive a tool locking arrangement indicated generally at 16.

Locking arrangement 16 comprises a main body 18 having a central aperture 20 internally threaded to cooperatively mount on the threaded projection 14.

The main body 18, at its forward end, is provided with a reduced diameter segment 22, said segment 22 having opposed flats 24, 24 milled on opposite sides. An annular pressure applying ring 26 is centrally pertured to congruently mount on the reduced diameter segment 22. The aperture is provided with flats 27 and arcs 29 (FIG. 4) which cooperate with the flats 24 and arcuate segment 25 of segment 22, permitting the pressure ring 26 to move longitudinally of the central axis of the device 16, but preventing any rotational movement of the ring 26 relative to the main body 18. A snap ring 28 received in a cooperative groove on the segment 22 maintains the pressure ring 26 in assembled relation on the main body 18. It will be apparent to persons skilled in the art that cooperating flats 24 and 27 are not the only mode of preventing rotation of ring 26. For example, the central aperture of pressure ring 26 may be provided with an internally directed pin which could be received in a longitudinal slot formed in the external surface of segment 22. This teaching, therefore, comprehends other functionally equivalent stuctures.

The main body 18 is circumferentially threaded as at 30 to cooperatively receive and mount compression ring 32. Compression ring 32 is annularly coned at its forward aspect to define an annular inclined plane surface 34 which overlies the reduced diameter segment 22 on main body 18.

In forming the reduced diameter segment 22 an inclined plane surface 36 is formed in the main body 18 and in acute angular relation with a transverse plane passing through and perpendicular to the longitudinal axis of the device 16. It will thus be apparent that an annular cavity 38 is defined in the device bounded by the inclined plane surface 36 and the transverse surface 40 formed on the rear aspect of the pressure ring 26.

The cavity 38 is filled with a plurality of steel balls or roller bearings 42, which are arranged to be engageable with the inclined plane surface 34, the inclined plane surface 36 and the transverse surface 40 of the pressure ring 26. The forward surface 42 of the pressure ring 26 is engageable with annular positioning ring 44 of the cutting tool assembly 8.

Describing now the function of the arrangement, the tool assembly 8 is first mounted in the spindle segment 6 with the annular ring 44 in the position shown in FIG. 1. With the compression ring 32 in the position shown in FIG. 1, the machine operator then grasps head 46 of the main body 18 and threadably mounts the device 16 on the threaded segment 14 of the spindle 2 until the forward surface 42 of the pressure ring 26 engages the ring 44. Using finger pressure only, he rotates the head 46 as tightly as possible. Thereafter, by hand rotation of the compression ring 32 the inclined plane 34 is moved longitudinally to the right, forcing the steel balls 42, 42 downwardly into cavity 38 and along inclined plane surface 36, creating pressure against the surface 40 of the pressure ring 26, driving the pressure ring to the right as seen in the figures and greatly multiplying the locking force against the ring 44, and, the ring 44 transferring locking pressure to tool 8. Thus, the cutting tool 8 is firmly mounted on spindle segment 6 and locked in position by operator hand manipulation. Wrench torquing and hammer blows which damage true spindle rotations is eliminated.

It will be apparent to those skilled in the art, that incident to the high speed rotation of the cutting tool 8, and the milling operations associated therewith, a great deal of vibratory energy will be distributed through the equipment. The natural tendency of this vibratory energy is to counteract and induce relief of the captured pressure in the device 16. However, due to the fact that the pressure ring 26 is inhibited from rotary movement about the main body 18 by virtue of the flats 24, 24, the tendency for pressure dissipation is presented and the frictional contact of the balls 42, with the surfaces 34, 36 and 40 is maintained. The cutting tool 8 remains properly locked on the spindle segment 6 under all operating conditions.

Having described the presently preferred embodiment, it is understood that such description is by way of illustration and not limitation and that the described invention may be subject to certain modifications, all within the spirit and scope thereof.

I claim:

1. In a force multiplying and locking arrangement for a device to be locked,
   a main body member adapted to be mounted on the device to be locked,
   a pressure member mounted on the main body member in a manner to allow longitudinal movement relative to the main body member and to prevent rotational movement relative to the main body member,
   a compression member threadably moveable relative to the main body member,
   first inclined plane means on the compression member,
   second inclined plane means on another member,
   roller means operatively disposed between the inclined plane means and engaging the pressure member,
   whereby, upon threadable movement of the compression member force available at the pressure member is greatly multiplied to lock said device.

2. A force multiplying and locking arrangement according to claim no. 1, wherein
   said second inclined plane means is on the main body member.

3. In a force multiplying and locking arrangement according to claim no. 2, wherein,
   said roller means are a plurality of spherical balls engaging said first and second inclined plane means and engaging a surface on said pressure element that is perpendicular to the line of longitudinal movement of said pressure element.

4. In a force multiplying and locking arrangement for a device to be demountably locked in position,
   a threaded element on the device,
   a main body having a central aperture for threadable mounting on said a element,
   said main body having a head to accomplish the manual mounting of said body on said threaded element,
   said main body having an annular circumferential thread for threadable mounting of internally threaded compression ring,
   said main body having a reduced diameter portion at the forward aspect thereof,
   a pressure ring mounted on said reduced diameter portion to allow movement thereof longitudinally of the main body and to prevent movement thereof rotationally relative to the main body,
   said compression ring having a conical inclined plane surface internally thereof and adjacent its forward aspect, said main body having an inclined plane surface formed thereon adjacent said reduced diameter portion, said inclined plane surface on said compression ring overlying said inclined plane surface on said main body, said inclined plane surface on said main body and said pressure ring defining a cavity in the arrangement, a plurality of spherical balls disposed in the cavity, said balls being engageable with said first mentioned inclined plane surface and said second inclined plane surface and said pressure ring, whereby, upon threadable movement of said compression ring longitudinally of the arrangement the spherical balls are forced into said cavity, greatly multiplying the force available at the pressure ring to lock said device.

5. In a force multiplying and locking arrangement for a device to be locked, the combination of a main body member adapted to be mounted on the device to be locked, a pressure member mounted on the main body member in a manner to allow longitudinal movement thereof relative to the main body member and to prevent rotational movement thereof relative to the main body member, a compression member threadably movable relative to the main body member, first inclined plane means on the compression member, second inclined plane means of the main body member, roller means operatively disposed between and engagable with both of the inclined plane means, said roller means engaging said pressure member, whereby upon threadable movement of the compression member in one direction the force available at the pressure member is greatly multiplied to pressure lock the device.

6. A force multiplying and locking arrangement for a device to be locked according to claim 5, wherein said roller means comprise a plurality of spherical roller bearings.

* * * * *